Figure 1:
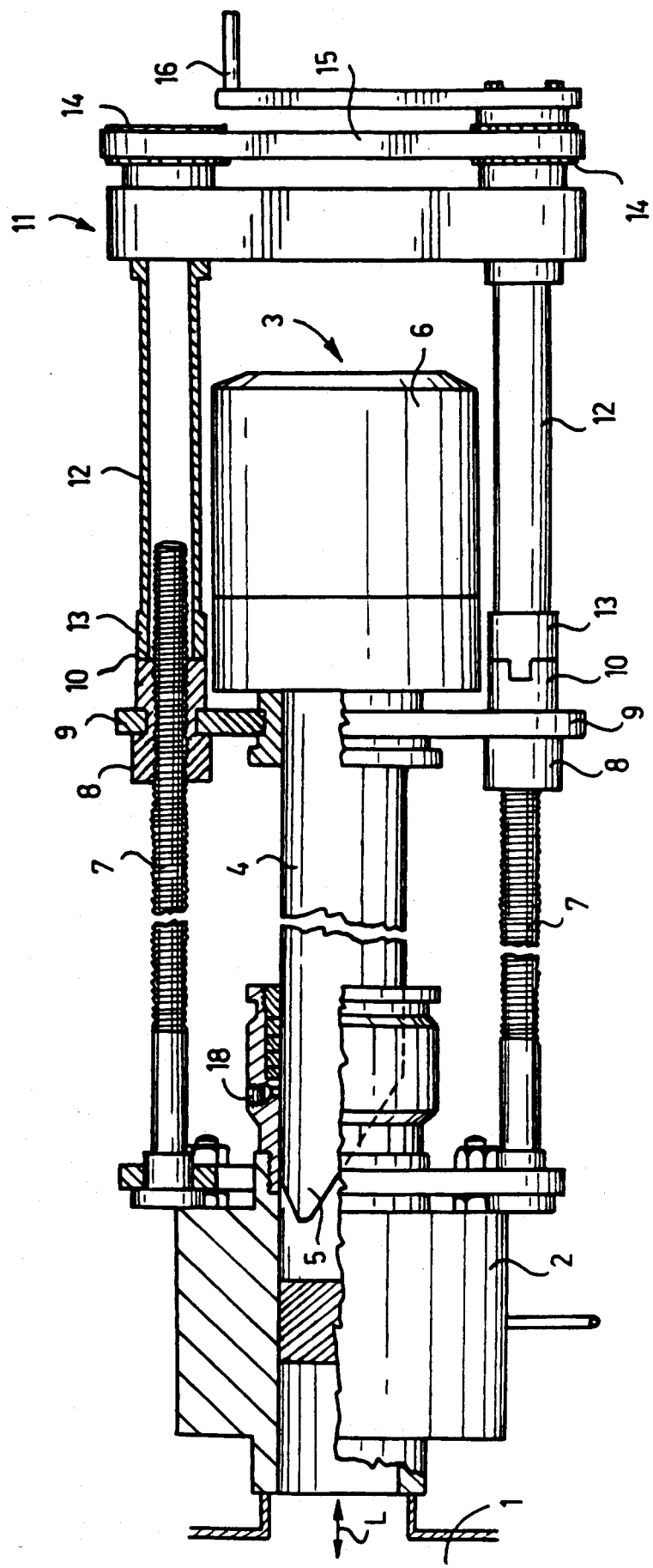

United States Patent [19]

Kamrat

[11] Patent Number: 5,009,113
[45] Date of Patent: Apr. 23, 1991

[54] ARRANGEMENT FOR DISPLACING A MEASURING HEAD OF A MEASURING MEANS INTO AND FROM A PROCESS SPACE

[75] Inventor: Esko Kamrat, Vantaa, Finland
[73] Assignee: Janesko Oy, Helsinki, Finland
[21] Appl. No.: 489,000
[22] Filed: Mar. 6, 1990

[30] Foreign Application Priority Data

Apr. 20, 1989 [FI] Finland .................................. 891894

[51] Int. Cl.⁵ ............................................. G01N 17/00
[52] U.S. Cl. .................................................. 73/866.5
[58] Field of Search ................. 73/866.5, 86; 204/225; 324/447

[56] References Cited

U.S. PATENT DOCUMENTS

| | | | |
|---|---|---|---|
| 4,179,920 | 12/1979 | Schuller et al. | 73/86 |
| 4,309,899 | 1/1982 | Torres | 73/86 |
| 4,633,713 | 1/1987 | Mesnard et al. | 73/866.5 |
| 4,665,760 | 5/1987 | Eramo et al. | 73/866.5 |
| 4,841,787 | 6/1989 | Waterman | 73/866.5 |
| 4,876,905 | 10/1989 | Callsen et al. | 73/866.5 |

Primary Examiner—Robert Raevis
Attorney, Agent, or Firm—Fitch, Even, Tabin & Flannery

[57] ABSTRACT

An arrangement for displacing a measuring head of a measuring device into and from a process space. The arrangement comprises a valve element and a measuring device. The measuring device comprises a tube, at one end of which there is a measuring head. The measuring device is arranged to be moved through the valve element to a position in which the measuring head extends into the process space and again to a position in which the measuring head is not in connection with the process space. To effect a controlled displacement of the measuring device, the arrangement comprises two threaded bars parallel to the displacement direction of the measuring device and fastened to the valve element as well as two threaded stop elements arranged in the measuring device. The motion for the displacement of the measuring device has been arranged to be effected by relative motion between the stop elements and the threaded bars.

4 Claims, 2 Drawing Sheets

ARRANGEMENT FOR DISPLACING A MEASURING HEAD OF A MEASURING MEANS INTO AND FROM A PROCESS SPACE

The invention relates to an arrangement for displacing a measuring head of a measuring means into and from a process space, which arrangement comprises a valve element to be fastened to a wall of the process space and a measuring means to be fastened to the valve element, which measuring means comprises an oblong tube, at one end of which there is a measuring head, whereby the measuring means is arranged to be moved through the valve element to a position in which the measuring head extends into the process space and back again to a position in which the measuring head is not in connection with the process space.

Such arrangements are well-known in various fields of technology at present. As examples can be mentioned the food industry, the wood-processing industry, the chemical industry and research work of different kinds. As measuring means are often used optical devices, the advantage of which is for instance that the process will not be disturbed. A further advantage is that the measuring procedure is stable and applicable to new process conditions. In addition, an optical measurement is technically reliable. As an example of a typical embodiment can be mentioned a measurement of the properties of black lye in the wood-processing industry.

As an example of typical solutions known in this field can be mentioned an embodiment to be fastened to a T-piece in a wall of the process space, e.g. a process tube. The embodiment comprises a ball valve, a tightening part and a measuring means. The measuring means comprises an oblong tube, at one end of which there is a measuring head, i.e. the part which is in contact with the substance to be measured in the measuring situation.

In the known solution mentioned above the measuring means is pushed a predetermined distance into the tightening part. At the next stage the measuring means is fastened to a combination of tightening part and ball valve by using cable wire means, one end of which is connected to the tightening part, and the measuring means is forced through the ball valve in such a way that the measuring head pushes into the process space. The measuring means can be locked in this position by means of lock screws.

A drawback of this known solution is for instance the use of cable wire to make sure that the measuring means does not push out when the ball valve is opened. The pressure of the process space can be high, and consequently, the force caused by this pressure and pushing the measuring device outwards can in some cases be rather great. The use of cable wires as safety installations in such situations is indeed dangerous. A further drawback is that a great force is often required to force the measuring means through the ball valve, because the T-piece can have e.g. dried black lye on it clogging the path of the measuring means. Moreover, the motion for pushing the measuring means is often counteracted by a rather great force caused by the pressure of the process space. Consequently, it is heavy and also difficult and even dangerous to install the measuring means in its place, because the measuring means is supported by cable wires only when the ball valve is opened and also when the measuring means is drawn out and the ball valve is not yet shut. The motion for pushing the measuring means is carried out manually and it is not a fully reliably controlled motion either. Thus, the installation depends very much on the level of expertise and carefuless of the employee. The direction of the pushing motion can easily differ from the direction defined by the T-piece, the ball valve and the tightening part, which can even lead to a damage of the devices in the worst case.

The object of the invention is to provide an arrangement by which a safe and fully controlled treatment of the measuring means is achieved. This has been reached by means of an arrangement of the invention, which is characterized in that the arrangement comprises at least two threaded bars parallel to the displacement direction of the measuring means and fastened to the valve element and at least two threaded stop elements located in the measuring means and arranged to cooperate with the threaded bars and that the displacement motion of the measuring means is arranged to be provided by means of a relative motion between the threaded stop elements and the threaded bars.

An advantage of the arrangement of the invention is in the first place that the measuring means is pushed through the valve means into and from the process space in a fully skilled and controlled manner. The displacement of the measuring means takes always place in exactly the right direction and always at a speed which can be controlled and chosen by the employee. A further advantage of the invention is its simplicity, which makes the utilization of the invention advantageous. The invention can be used in connection with existing measuring means, valves etc. and thus advantageously at plants already existing. One more advantage is also that the motion for pushing the measuring means can easily be provided with a considerable force, and consequently, e.g., the process substance passed into the T-piece or the valve thus clogged up does not cause any problems. A flushing and heating operation can also be attached to the invention in an advantageous manner, which eliminates the clogging phenomenon.

Figure 2:
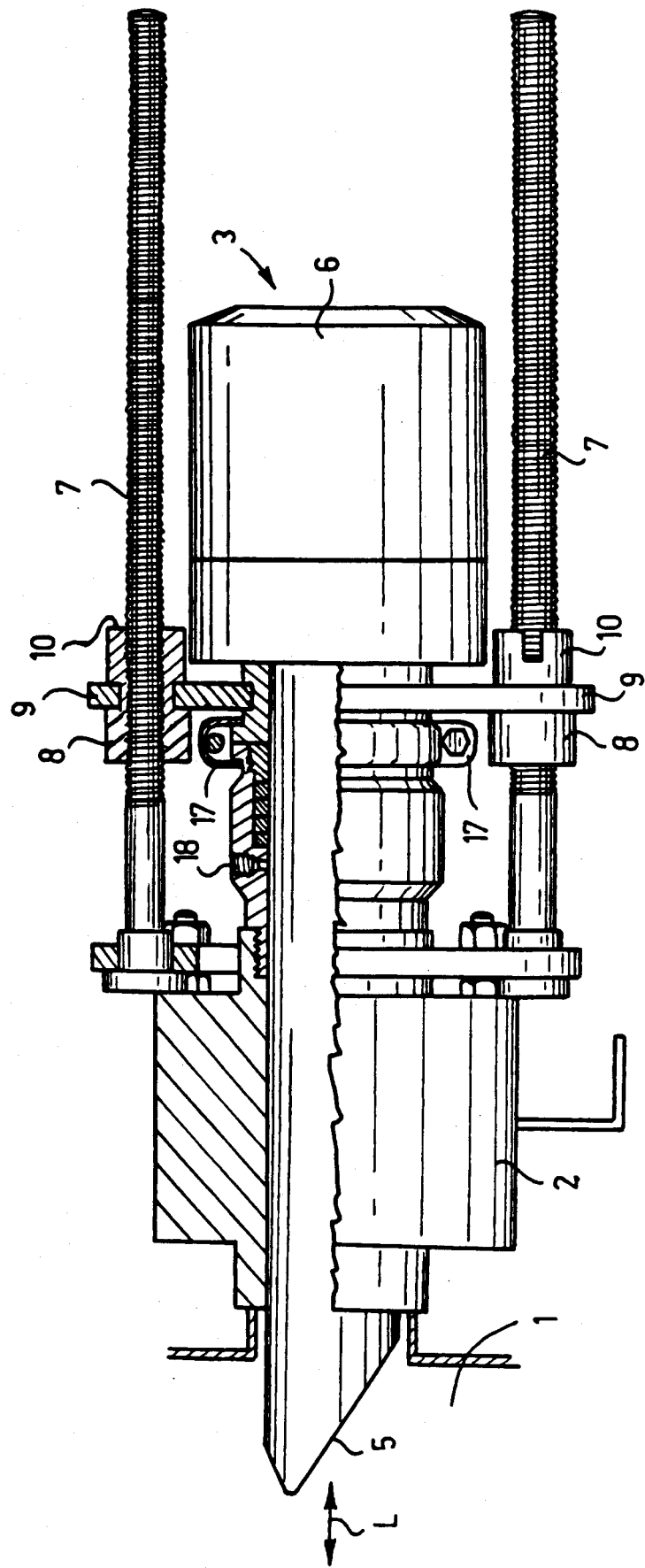

The invention will be described by means of an embodiment shown in the drawing enclosed, FIG. 1 showing an embodiment of the invention with a measuring means in the rear position and FIG. 2 showing the embodiment of FIG. 1 in a situation in which a measuring head is in a process space.

FIG. 1 shows an embodiment of the invention in a situation in which a measuring means is in the rear position, i.e. in a position in which a measuring head is not in a process space. The situation of FIG. 1 occurs for instance when the measuring means is mounted in its place or when it is removed.

In FIG. 1 the process space is indicated by the reference numeral 1. The process space 1 can be for instance a tube, in which flows black lye. The reference numeral 2 indicates generally a valve element. The valve element 2 can be fastened to the process space in any manner known per se, e.g., by means of a flange joint. The valve element itself can be any valve known per se, e.g., a ball valve, a suitable slide valve etc. A measuring means is generally indicated by the reference numeral 3. The measuring means 3 comprises an oblong tube 4, at one end of which there is a measuring head 5 and at the other end a part 6 including, e.g., a light source, a circuit analyzer etc. As measuring means, any suitable device can be used. As an example of suitable devices can be mentioned the process refractometer PR-01 of the company K-Patents.

The structure and the operation of the valve element and the measuring device mentioned above consist of a technique known to one skilled in the art, and consequently, these facts are not touched more closely in this connection.

According to the invention, the arrangement comprises at least two threaded bars 7 parallel to the displacement direction of the measuring means. Additionally, the arrangement comprises at least two threaded stop elements 8 located in the measuring means 3.

In the example of the figures, the threaded bars 7 are stationarily fastened to the valve element 2. Moreover, the threaded bars 7 are arranged to cooperate with the threaded stop elements 8 arranged in the measuring means 3. In the example of the figures, the stop elements 8 are threaded bushings rotatably mounted in bearings on a flange 9 fastened to the measuring means 3. The threaded bars 7 are arranged to go through the stop elements 8.

The essential thing of the invention is that the measuring means 3 can be displaced fully controllably in a direction L by means of a relative motion between the threaded stop elements 8 and the threaded bars 7. In the embodiment of the figures, this relative motion is effected by rotating the stop elements 8 rotatably arranged in the measuring means 3. For the rotation, the stop elements 8 are provided with joining elements 10, to which a device 11 for the rotation of the stop elements can be fastened The device for the rotation of the stop elements comprises bushings 12 to be pushed on the threaded bars so that parts 13 can be connected to the joining elements 10.

To effect a simultaneous rotation of the stop elements 8, the rotating device 11 comprises transmission means 14, 15, by the aid of which the rotating force can be simultaneously transferred to both stop elements 8. In the example of the figures, a combination of cogged wheel and cogged belt is used as transmission means and the rotating force is created by means of a crank 16.

The arrangement of the invention functions in principle as follows. In the starting situation, for instance when the measuring means shall be located at a special place of the process, the arrangement is mounted in the position of FIG. 1. The valve element 2 is shut at that moment. After the arrangement has been mounted in its place correctly, the measuring means 3 can be displaced in the direction L in such a way that the measuring head 5 moves into the process space 1. The displacement of the measuring means occurs by rotating at the crank 16, whereby the rotating force is simultaneously transferred to both stop elements 8. The rotational motion of the stop elements 8 as well as the cooperation with the threads of the threaded bars 7 makes the measuring means to move from the right to the left in FIG. 1 whereby the measuring head is displaced into the process space 1. To enable this displacement, the valve element 2 shall naturally be opened so that the end part of the measuring means can move through the valve element. The measuring means is displaced in this manner until the measuring means 3 is in the position of FIG. 2. To secure the tightening, the measuring means can be locked into the position of FIG. 2 by means of a clamp 17. The rotating device 11 can be removed according to FIG. 2, if desired.

After these steps the measuring operation can begin. The measuring operation itself consists of a technique self-evident for one skilled in the art, and consequently, these facts are not presented more accurately in this connection.

If it is desirable to remove the measuring means from the process space, the rotating device is fastened to the stop elements, the clamp 17 is opened, the measuring means is displaced back to the position of FIG. 1 by rotating the rotating device and the valve element is shut.

By means of the arrangement of the invention, a controlled displacement of the measuring means is effected in all situations, i.e. a displacement with an exactly correct direction of motion and with a speed of motion of exactly the size desired. The displacement is fully safe, because the measuring means will not move outwards from the influence of the pressure of the process space when the valve means is opened. The displacement of the measuring means also creates a considerable force, whereby the process substance possibly dried on the valve element or on the joining parts does not make the displacement of the measuring means more difficult. Further, it is possible to complement the invention by a flushing/heating operation for instance by feeding vapour through a connector 18, in which case possible cloggings are removed before the displacement of the measuring means.

The embodiment described above is by no means intended to restrict the invention, but the invention can be modified within the scope of the claims quite freely. Thus it is clear that the arrangement of the invention does not need to be quite as presented in the figures, but solutions of another kind can also be used. The threaded bars can for instance be rotatably mounted in bearings on the valve element, and the stop elements again can be unrotatably fastened to the measuring means. The relative motion between the threaded bars and the stop elements displacing the measuring means is then effected by rotating the threaded bars. As transmission means of the rotating force can naturally be used also gear transmission, chain transmission etc. The rotating force can also be created by means of a motor etc. The rotating device can be made to a stationary or detachable part. The number of threaded bars and stop elements is not restricted to two either, and consequently, it is possible to use also several threaded bars and stop elements, if it is considered necessary. The arrangement can also be provided with locking devices making it possible to open or shut the valve element only when the measuring means is in the position of FIG. 1.

I claim:

1. An arrangement for displacing a measuring head of a measuring means into and from a process space, which arrangement comprises a valve element to be fastened to a wall of the process space and a measuring means to be fastened to the valve element, which measuring means comprises an oblong tube, at one end of which is a measuring head, the measuring means being arranged to be moved through the valve element to a position in which the measuring head extends into the process space and back again to a position in which the measuring head is not in connection with the process space, said arrangement comprising at least two threaded bars parallel to the displacement direction of the measuring means and fastened directly to the valve element and at least two threaded stop elements in the form of bushings rotatably mounted on a flange located on the measuring means and arranged to directly cooperate with the threaded bars, the threaded stop elements being provided with joining elements for the fastening of a device for the rotation of the stop elements, and displacing motion of the measuring means being provided by relative motion between the threaded stop elements and the threaded bars.

2. An arrangement according to claim 1, wherein the threaded stop elements are rotatably mounted in bearings on the measuring means and the threaded bars are fastened stationarily to the valve element.

3. An arrangement according to claim 1, wherein the device for the rotation of the stop elements is arranged to rotate all stop elements simultaneously.

4. An arrangement according to claim 3, wherein the rotating device is detachably fastened to the stop elements.

* * * * *